(12) United States Patent
Iinuma et al.

(10) Patent No.: US 7,460,736 B2
(45) Date of Patent: Dec. 2, 2008

(54) SCAN DATA TRANSMISSION APPARATUS AND SCAN DATA TRANSMISSION SYSTEM

(75) Inventors: Satoshi Iinuma, Nagano (JP); Yuji Matsueda, Nagano (JP); Yukinobu Momozono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 664 days.

(21) Appl. No.: 11/038,786

(22) Filed: Jan. 19, 2005

(65) Prior Publication Data

US 2005/0174592 A1    Aug. 11, 2005

(30) Foreign Application Priority Data

Jan. 20, 2004    (JP)    ............ P. 2004-011857

(51) Int. Cl.
*G06K 9/60* (2006.01)

(52) U.S. Cl. ............ 382/305; 382/306; 382/307; 707/2; 707/10; 707/205

(58) Field of Classification Search ........ 382/303, 382/305, 307, 306; 707/2, 10, 205
See application file for complete search history.

(56) References Cited

U.S. PATENT DOCUMENTS

| | | | | |
|---|---|---|---|---|
| 5,499,108 | A | * | 3/1996 | Cotte et al. .......... 358/400 |
| 6,292,267 | B1 | * | 9/2001 | Mori et al. .......... 358/1.15 |
| 6,522,421 | B2 | * | 2/2003 | Chapman et al. .......... 358/1.15 |
| 6,559,964 | B1 | * | 5/2003 | Tsukamoto et al. ........ 358/1.15 |
| 6,704,039 | B2 | * | 3/2004 | Pena .................. 348/14.01 |
| 6,763,373 | B2 | * | 7/2004 | Shiigi .................. 709/206 |
| 6,789,060 | B1 | * | 9/2004 | Wolfe et al. .............. 704/235 |
| 6,954,742 | B2 | * | 10/2005 | Cordery et al. ........... 705/402 |
| 7,123,371 | B1 | * | 10/2006 | Yoda et al. ............... 358/1.15 |

FOREIGN PATENT DOCUMENTS

| | | |
|---|---|---|
| JP | 11-168591 | 6/1999 |
| JP | 2000-253201 | 9/2000 |
| JP | 2000-339243 | 12/2000 |
| JP | 2002-158827 | 5/2002 |
| JP | 2003-078703 | 3/2003 |
| JP | 2003-289319 | 10/2003 |
| JP | 2003-298822 | 10/2003 |
| JP | 2005-198072 | 7/2005 |

OTHER PUBLICATIONS

CS-7000 User's Manual produced by Seiko Epson Corporation, Apr. 16, 2003, pp. 1-19.

* cited by examiner

*Primary Examiner*—Yosef Kassa
(74) *Attorney, Agent, or Firm*—Hogan & Hartson LLP

(57) ABSTRACT

A scan data transmission apparatus and a scan data transmission system are configured for enabling the user to give execution commands of processing of saving a file of image data of an original in a shared folder and processing of transmitting e-mail to which the file of the image data of the original is attached at a time (specify the mail address as the mail destination and the folder to save the file at the same time).

5 Claims, 16 Drawing Sheets

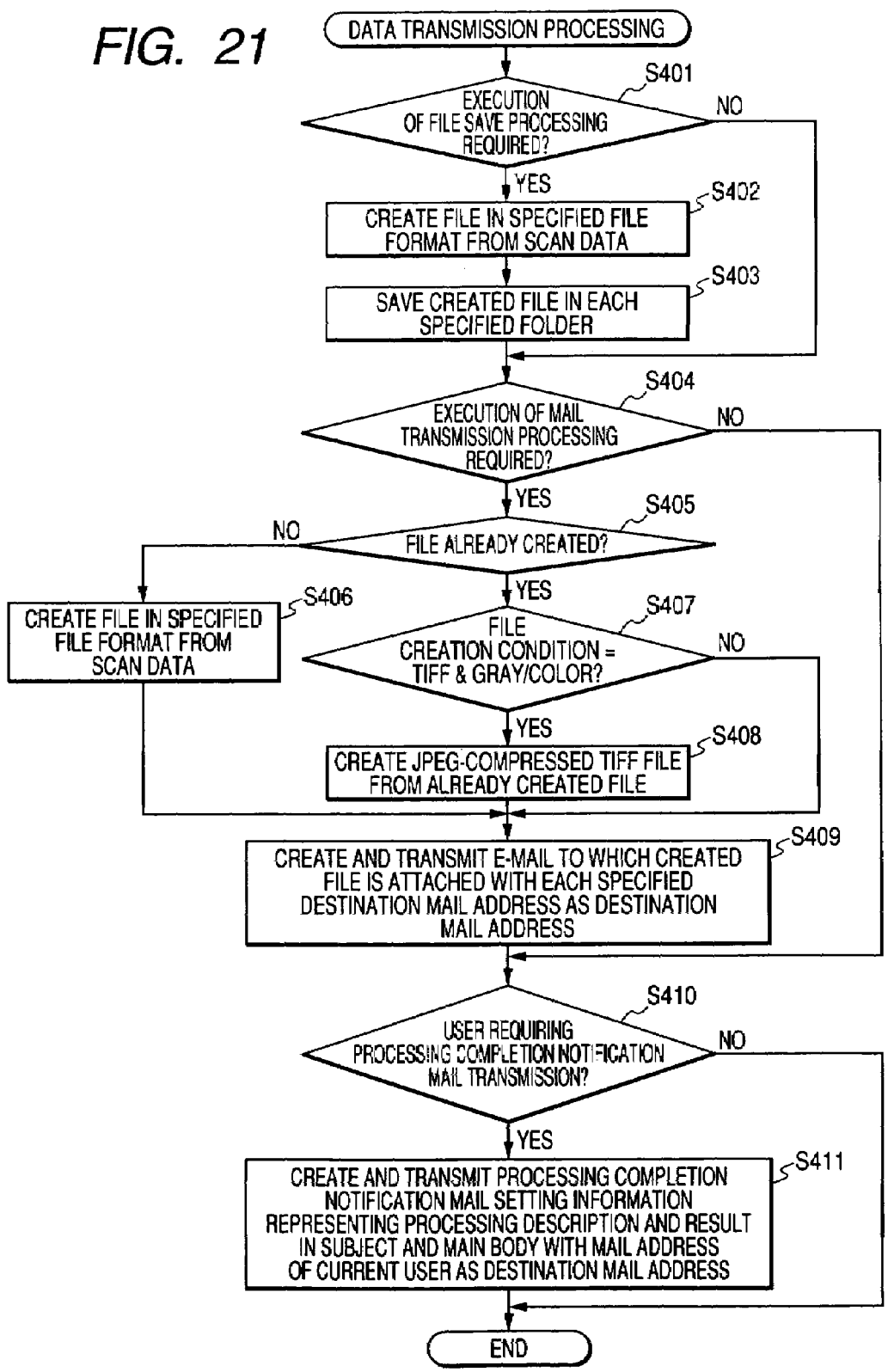

FIG. 22A

```
TRANSMITTING PERSON: User001
DATE AND TIME:       DECEMBER 21, 2003, 10:01
DESTINATION:         User001
SUBJECT:             ScanImage (folderA)

THE FOLLOWING PROCESSING IS COMPLETE:
   ——— SCAN TO FILE ———
   ¥¥computerA¥ScanData¥0311061148.pdf
```

FIG. 22B

```
TRANSMITTING PERSON: User001
DATE AND TIME:       DECEMBER 21, 2003, 10:01
DESTINATION:         User001
SUBJECT:             ScanImage (folderA)   SendData (UserA)

THE FOLLOWING PROCESSING IS COMPLETE:
   ——— SCAN TO FILE ———
   ¥¥computerA¥ScanData¥0311061148. pdf
   ——— SCAN TO MAIL ———
   xxxx@xxx. yyy. co. jp
```

FIG. 22C

```
TRANSMITTING PERSON: User001
DATE AND TIME:       DECEMBER 21, 2003, 10:01
DESTINATION:         User001
SUBJECT:             ScanImage (folderA)   SendData (UserA)

THE FOLLOWING PROCESSING IS COMPLETE:
   ——— SCAN TO MAIL ———
   xxxx@xxx. yyy. co. jp THE FOLLOWING PROCESSING ENDS IN FAILURE:
   ——— SCAN TO FILE ———
      FILE SAVING IN ¥¥computerA¥ScanData
         (FILE WRITE ENDS FAILURE)
```

SCAN DATA TRANSMISSION APPARATUS AND SCAN DATA TRANSMISSION SYSTEM

BACKGROUND OF THE INVENTION

This invention relates to a scan data transmission apparatus and a scan data transmission system that can generate image data of an original and save a file of the image data in a folder.

In recent years, there have been some commercially available digital multifunction processing machines placed in a state in which scan to mail processing and scan to file processing can be performed as each digital multifunction processing machine is connected to a LAN and a predetermined program, which will be hereinafter referred to as function addition program, is previously installed in a computer on the LAN. (Refer to non-patent document 1.)

The scan to mail processing is processing wherein scan data (image data of an original generated by a scanner of a digital multifunction processing machine) is transmitted from the digital multifunction processing machine to a computer in which the function addition program is installed and the computer transmits e-mail to which a file of data provided by processing the scan data (data whose data format is converted) is attached to several destinations specified by the user, as schematically shown in FIG. 23A. The scan to file processing is processing wherein scan data is transmitted from a digital multifunction processing machine to a computer in which the function addition program is installed and the computer saves a file of data provided by processing the scan data in the location specified by the user (a shared folder in a file server), as schematically shown in FIG. 23B.

The digital multifunction processing machine is an apparatus which requires the user to check the contents of the folder specified to save the file on a regular basis to check completion of the scan to file processing from the computer.

Non-patent document 1: CS-7000 User's Manual produced by Seiko Epson.

SUMMARY OF THE INVENTION

It is therefore an object of the invention to provide a scan data transmission apparatus and a scan data transmission system that can perform processing of saving a file of image data of one original in a folder and enable the user to easily keep track of completion of the processing.

In order to solve the aforesaid object, the invention is characterized by having the following arrangement.

(1) A scan data transmission apparatus being connected to a network for use, said scan data transmission apparatus comprising:
an image data generator that generates from a set original, image data representing an image on the original;
an information storage that stores a plurality of user names and a plurality of e-mail addresses in such a manner that correspondence between the user names and the e-mail addresses can be understood;
a user interface unit that allows a user to specify a file path of a folder in which a file of the image data generated by the image data generator is to be saved after the user specifies one user name from among the user names stored in the information storage;
an image data transmitter that executes, when a processing start command is entered, processing of causing the image data generator to generate the image data and saving a file concerning the image data in the folder identified by the folder path specified by the user for the user interface unit; and a processing completion notification mail transmitter that transmits, when the processing of the image data transmitter terminates, transmits processing completion notification mail of e-mail to the e-mail address which is stored in the information storage and related to the user name specified by the user, wherein the processing completion notification includes a main body that indicates whether or not the processing of the image data transmitter has normally completed.

(2) The scan data transmission apparatus according to (1), wherein
the user interface unit allows the user to specify any number of file paths of folders in which a file of the image data generated by the image data generator is to be saved and any number of destination mail addresses of e-mail to which a file of the image data generated by the image data generator is attached,
when the processing start command is entered, if the user does not specify any destination mail address for the user interface unit, the image data transmitter performs processing of causing the image data generator to generate image data and saving a file concerning the image data in each folder identified by each folder path specified by the user; if the user does not set any file path for the user interface unit, the image data transmitter performs processing of causing the image data generator to generate image data and creating and transmitting e-mail to which a file concerning the image data is attached with each destination mail address specified by the user as the destination mail address; and if the user specifies one or more file paths and one or more mail addresses for the user interface unit, the image data transmitter performs processing of causing the image data generator to generate image data and saving a file concerning the image data in each folder identified by each folder path specified by the user and processing of creating and transmitting e-mail to which a file concerning the image data is attached with each destination mail address set by the user as the destination mail address, and
the processing completion notification mail transmitter transmits the processing completion notification mail the main body of which indicates whether or not the processing of the image data transmitter has normally completed by file destination.

(3) The scan data transmission apparatus according to (1), wherein the processing completion notification mail transmitter transmits the processing completion notification mail a subject of which indicates a description of the destination specified by the user.

(4) The scan data transmission apparatus according to (1), wherein the processing completion notification mail transmitter transmits processing completion notification mail in which the file path specified by the user for the user interface unit is set in the main body as the processing completion notification mail.

(5) The scan data transmission apparatus according to (2), wherein the processing completion notification mail transmitter transmits processing completion notification mail in which each file path and each mail address specified by the user for the user interface unit are set in the main body together with information indicating the type of processing performed by the image data transmitter.

(6) A scan data transmission system comprising an information processing apparatus and an auxiliary information processing apparatus connected to a network, wherein
the auxiliary information processing apparatus comprises:
a first processing execution unit that performs processing of saving a file concerning image data transmitted from the information processing apparatus in a folder identified by a folder path transmitted from the information processing apparatus;

a second processing execution unit that performs processing of transmitting e-mail to which the file concerning image data transmitted from the information processing apparatus is attached with a destination mail address transmitted from the information processing apparatus as a destination mail address; and a third processing execution unit that performs processing of saving a file concerning image data transmitted from the information processing apparatus in a folder identified by a folder path transmitted from the information processing apparatus and processing of transmitting e-mail to which the file concerning image data is attached with a destination mail address transmitted from the information processing apparatus as a destination mail address, and the information processing apparatus comprises:

an image data generator that generates from a set original, image data representing an image on the original;

a user interface unit that requests a user to specify the descriptions of processing to be executed and allows the user to specify both or either of a file path of a folder in which a file of the image data generated by the image data generator is to be saved and a destination mail address of e-mail to which a file of the image data generated by the image data generator is attached; and a controller, wherein when a processing start command is entered, if the user specifies only the file path for the user interface unit, the controller causes the image data generator to generate image data and transmits the image data and the file path specified by the user to the auxiliary information processing apparatus, to cause the first processing execution unit to function, wherein if the user specifies only the mail address for the user interface unit, the controller causes the image data generator to generate image data and transmits the image data and the mail address specified by the user to said auxiliary information processing apparatus, to cause the second processing execution unit to function, and wherein if the user specifies the file path and the mail address for the user interface unit, the controller causes the image data generator to generate image data and transmits the image data and the file path and the mail address specified by the user to the auxiliary information processing apparatus, to cause the third processing execution unit to function.

The processing performed by the information processing apparatus and the auxiliary information processing apparatus of the scan data transmission system is essentially the same as the processing performed by the scan data transmission apparatus of the invention. Therefore, the scan data transmission system of the invention is a system for enabling each user to easily keep track of the termination of the processing started by the user.

BRIEF DESCRIPTION OF THE DRAWINGS

In the accompanying drawings:

FIG. 9 is a schematic representation of a folder setting page provided by the scan agent computer;

FIG. 10 is a schematic representation of a destination setting page provided by the scan agent computer;

FIG. 21 is a flowchart of data transmission processing executed by the scan agent computer;

FIGS. 22A to 22C are schematic representation of processing completion notification mail created and transmitted by the scan agent computer.

DETAILED DESCRIPTION OF PREFERRED EMBODIMENTS

Referring now to the accompanying drawings, the best mode for carrying out the invention will be discussed in detail.

To begin with, the hardware configuration of a scan data transmission system according to one embodiment of the invention will be discussed with FIGS. 1 to 4.

Figure 1:
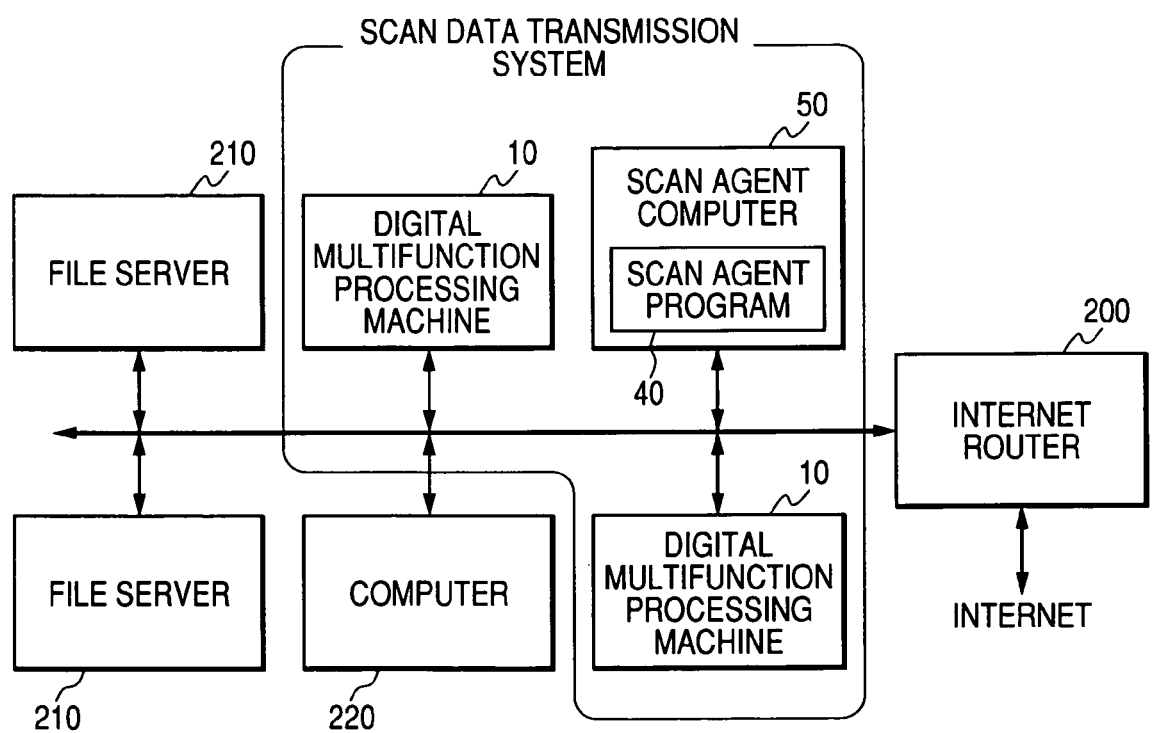
FIG. 1 is a schematic representation of the configuration and the use mode of a scan data transmission system according to one embodiment of the invention.

As shown in FIG. 1, the scan data transmission system according to the embodiment is a system including one or more (in the figure, two) digital multifunction processing machines 10 (corresponding to information processing apparatus) and a scan agent computer 50 (corresponding to auxiliary information processing apparatus) which are connected through a network. The scan data transmission system is also a system connected to the network including an Internet router 200, several file servers 210, several (in the figure, one) computers 220, etc.

The Internet router 200 is an apparatus for the computers 220, etc., to the Internet. The file server 210 is a computer in which a shared folder is set. The computer 220 is a computer used by the manager and general users of the scan data transmission system (computer in which a Web browser is installed).

The scan agent computer 50 is a computer installing a scan agent program 40 developed for the scan data transmission system (corresponding to auxiliary information processing program). The function of the scan agent program 40 is described later. The scan agent program 40 is a program requiring the user to set the manager name and a password and set a work folder and a mail server at the installation (setup) time.

Figure 2:
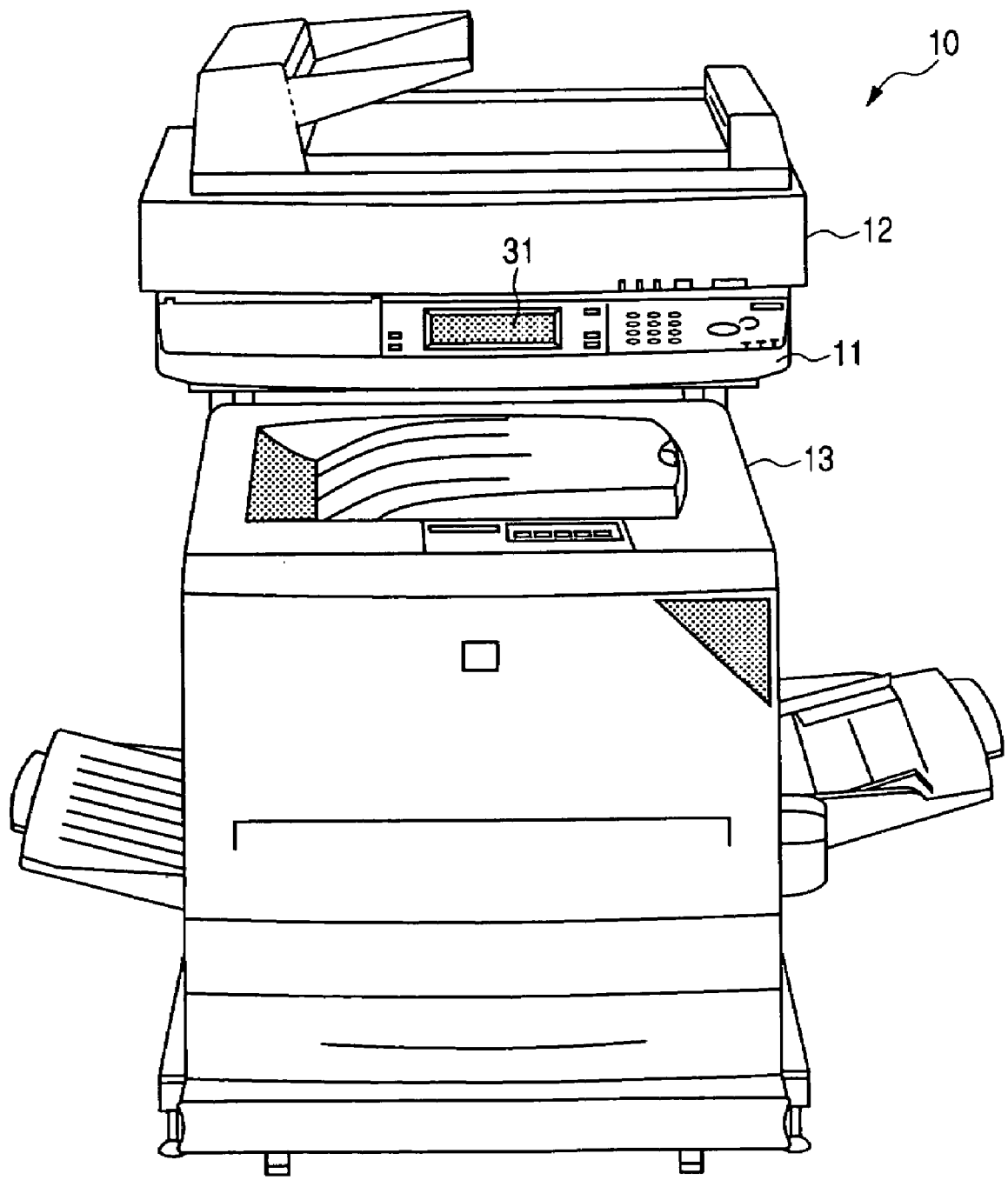
FIG. 2 is an external view of a digital multifunction processing machine contained in the scan data transmission system according to one embodiment of the invention.
Figure 3:
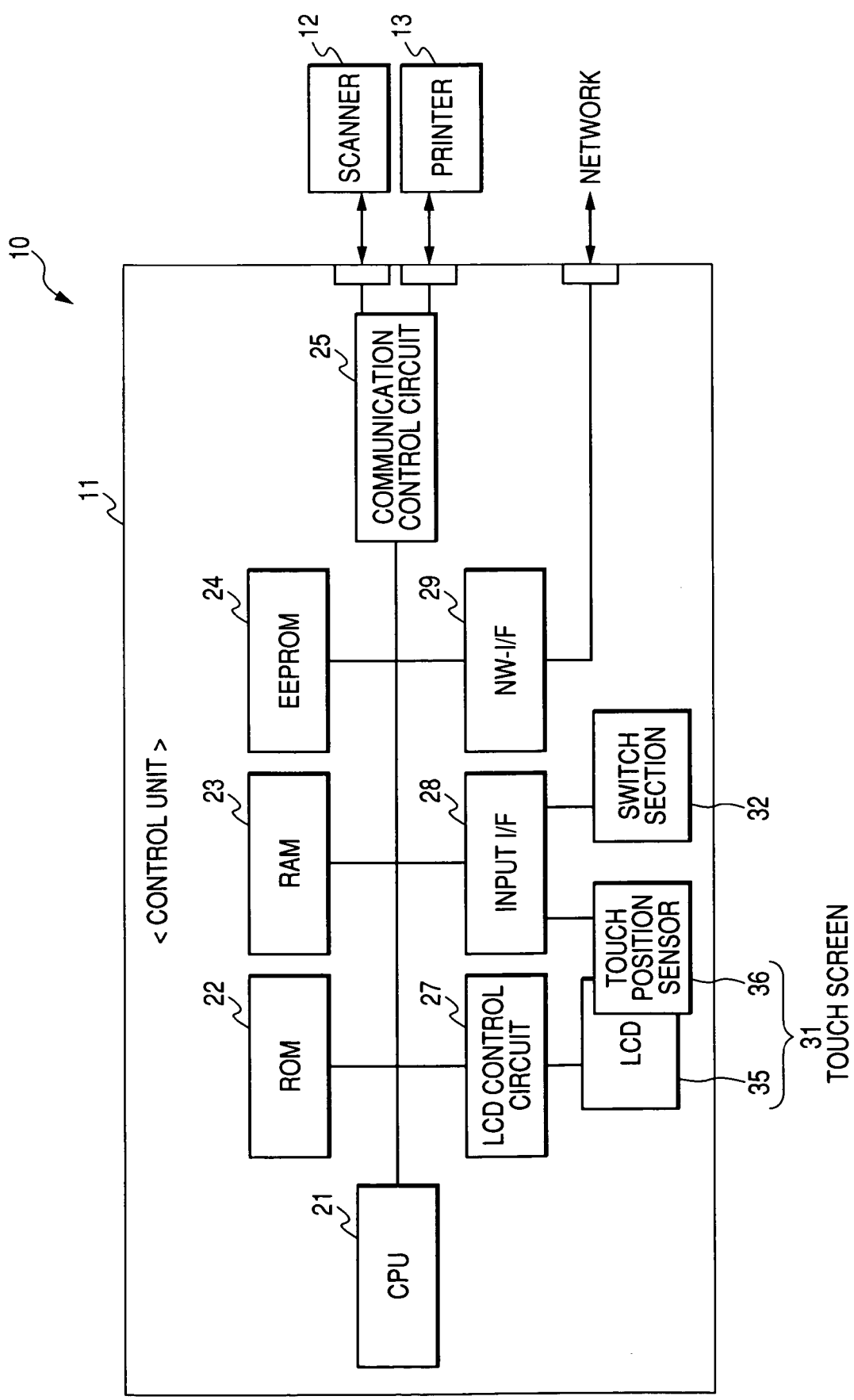
FIG. 3 is a block diagram of the digital multifunction processing machine.

The digital multifunction processing machine 10 is an apparatus having the appearance and the hardware configuration shown in FIGS. 2 and 3 respectively. That is, the digital multifunction processing machine 10 is an apparatus combining a control unit 11, a scanner 12, and a printer 13 so as to have the appearance like that of a general digital multifunction processing machine/copier (see FIG. 2).

The printer 13 used as a part of the digital multifunction processing machine 10 is an apparatus having an expansion board to form the digital multifunction processing machine 10 (to connect the control unit 11 and the printer 13), the expansion board placed in a printer that can be used as a computer peripheral apparatus. The scanner 12 is an apparatus having an expansion board to form the digital multifunction processing machine 10 (to connect the control unit 11 and the scanner 12), the expansion board placed in a scanner that can be used as a computer peripheral apparatus.

The control unit 11 is a unit made up of a CPU 21, ROM 22, RAM 23, EEPROM 24, a communication control circuit 25, an LCD control circuit 27, an input interface circuit (input I/F) 28, a network interface circuit (NW-I/F) 29, a touch screen 31, a switch section 32, etc., as shown in FIG. 3.

Figure 4:
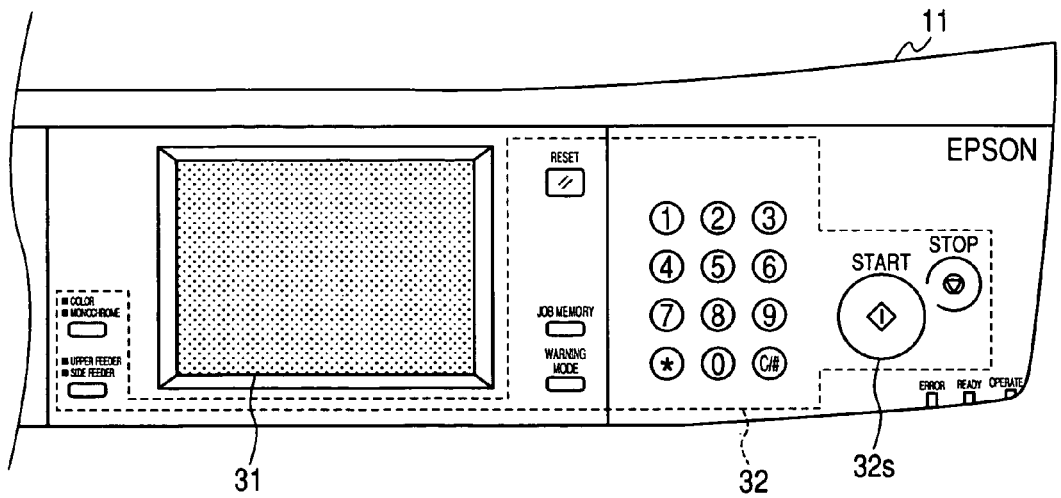
FIG. 4 is an external view of a control unit contained in the digital multifunction processing machine.

The touch screen 31 used as a part of the control unit 11 is a component having a transparent touch position sensor 36 put on a liquid crystal display (LCD) 35. The touch screen 31 is placed on the top of a cabinet of the control unit 11 as shown in FIGS. 2 and 4. The switch section 32 (see FIGS. 3 and 4) is a unit made up of pushbutton switches such as a start button 32s and ten keys and a control circuit thereof.

The CPU 21 (FIG. 3) is a control circuit for integrally controlling the parts of the digital multifunction processing machine 10 (the components in the control unit 11, the scanner 12, and the printer 13). The ROM 22 is read-only memory recording a program defining the operation procedure of the CPU 21 and data used by the CPU 21 (program). The RAM 23 is memory into which the program recorded in the ROM 22 is read and is also memory used as a work area of the CPU 21 (program). The communication control circuit 25 is a circuit used for the CPU 21 to exchange information with the scanner 12 or the printer 13 (transmit a command, receive image data, transmit print data).

The LCD control circuit 27 is a circuit for displaying an image (screen) as instructed from the CPU 21 on the touch screen 31 (LCD 35). The input interface circuit 28 is a circuit for notifying the CPU 21 how the user (the operator of the digital multifunction processing machine 10) operates the ten-key section 32 or the touch screen 31 (touch position sensor 36). The network interface circuit 29 is a circuit for connecting the control unit 11 to the network.

The EEPROM 24 is nonvolatile rewritable memory installed in the control unit 11 to store various pieces of information which need to be saved if power is turned off (apparatus IP address, agent IP address, etc., described later).

Figure 5:
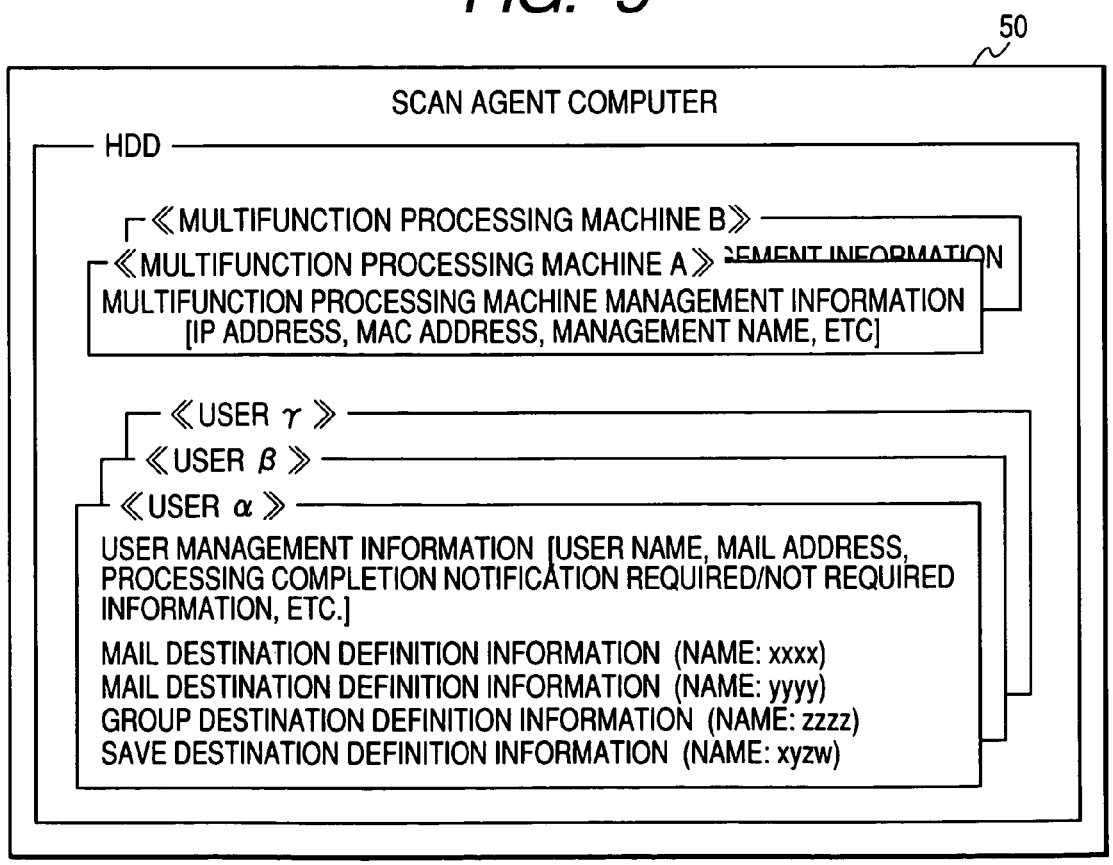
FIG. 5 is a schematic representation of information stored in a scan agent computer contained in the scan data transmission system.

The operation of the scan data transmission system is as follows:

The scan data transmission system is configured so as to operate in a state in which information as schematically shown in FIG. 5 is stored in an HDD of the scan agent computer 50.

That is, the scan data transmission system is a system operating in a state in which multifunction processing machine management information is stored by digital multifunction processing machine 10 (in the figure, multifunction processing machine A, B) and user management information and several pieces of destination definition information (mail, group, and save destination definition information) by user (in the figure, user α, β, γ) in the HDD of the scan agent computer 50.

The multifunction processing machine management information stored with respect to each digital multifunction processing machine 10 in the scan agent computer 50 is information made up of the IP address, the MAC address, the management name, etc., of the corresponding digital multifunction processing machine 10. The multifunction processing machine management information is automatically registered in the scan agent computer 50 when the digital multifunction processing machine 10 is initialized.

Specifically, the control unit 11 is a unit which requires the user (operator) to assign the IP address, which will be hereinafter referred to as apparatus IP address, and store the IP address assigned to the scan agent computer 50, which will be hereinafter referred to as agent IP address, when the control unit 11 is installed (is built in the network).

The control unit 11 is configured so as to enable the user (operator) to assign the apparatus IP address and store the agent IP address by operating the ten keys and the touch screen 31 on the control unit 11 and so as to store the setup apparatus IP address and agent IP address in the EEPROM 24.

Further, if power is turned on in a state in which the apparatus IP address and the agent IP address are stored in the EEPROM 24 or if the apparatus IP address or the agent IP address is changed, the control unit 11 is configured so as to transmit an IP address registration and check request made up of the apparatus IP address, the MAC address of the control unit (network interface circuit 29), the model name of the control unit, the model name of the scanner 12, information indicating the attachment state of an optional apparatus (ADF) of the scanner 12, and the like to the apparatus specified by the agent IP address stored in the EEPROM 24 (namely, the scan agent computer 50).

Figure 6:
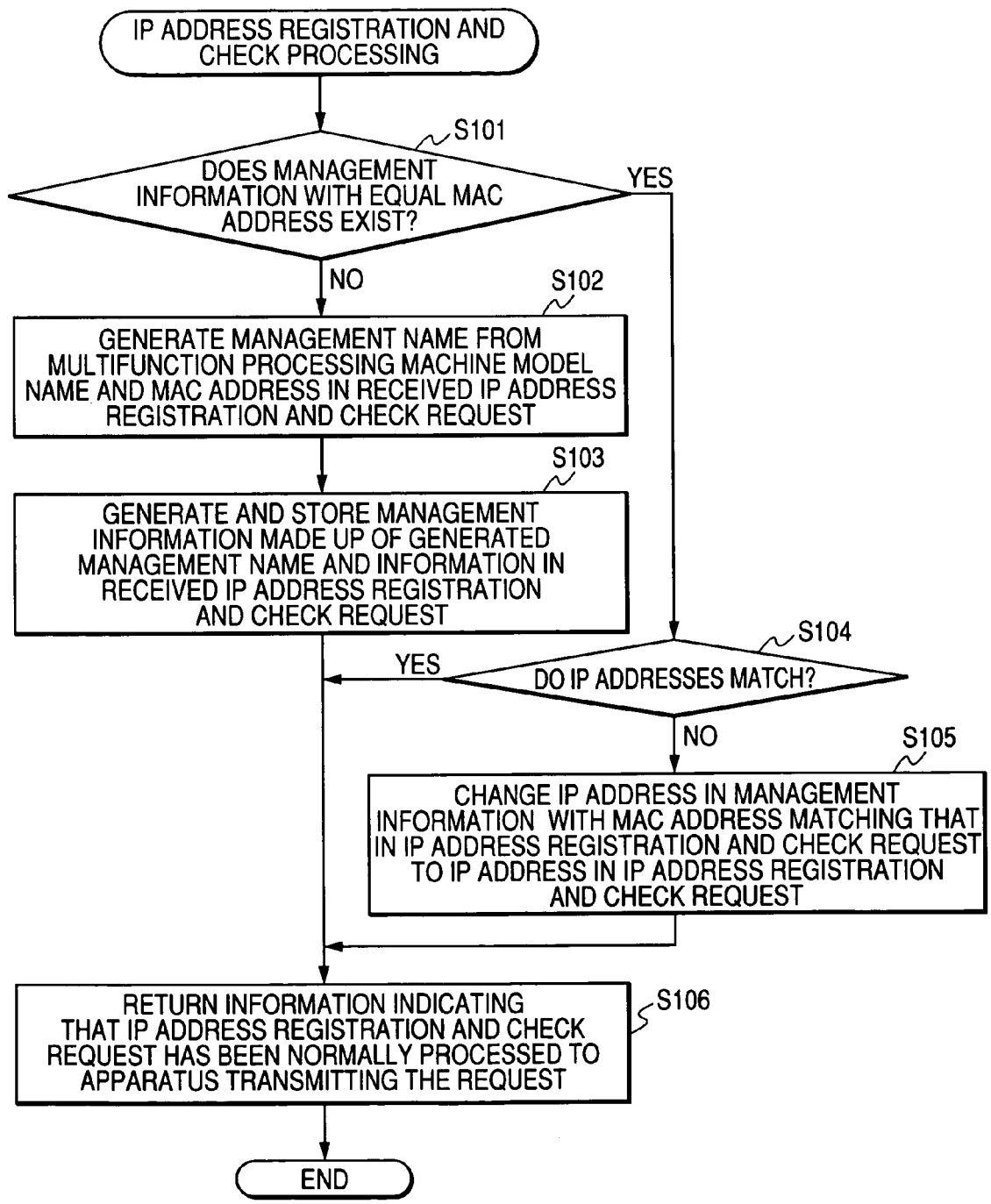
FIG. 6 is a flowchart of IP address registration and check processing executed by the scan agent computer.

On the other hand, the scan agent program 40 is a program for causing the scan agent computer 50 receiving the IP address registration and check request to execute IP address registration and check processing whose procedure is shown in FIG. 6.

That is, the scan agent computer 50 receiving the IP address registration and check request determines whether or not the multifunction processing machine management information corresponding to the IP address registration and check request is stored in the scan agent computer (in a predetermined folder in the HDD included in the scan agent computer) (S101). The multifunction processing machine management information corresponding to the received IP address registration and check request is the multifunction processing machine management information containing the same MAC address as the MAC address contained in the received IP address registration and check request (see FIG. 5).

If the multifunction processing machine management information corresponding to the received IP address registration and check request is not stored in the scan agent computer (NO at S101), the scan agent computer 50 combines the model name of the control unit 11 and a part of the MAC address of the control unit 11 contained in the IP address registration and check request to generate a management name (information presented to the user as the identification information of the digital multifunction processing machine 10) (S102). Next, the scan agent computer 50 generates multifunction processing machine management information containing the generated management name and the information contained in the received IP address registration and check request and stores the generated multifunction processing machine management information in the scan agent computer (S103). The processing actually executed at S102 is processing of generating a character string of the model name of the control unit 11 followed by the last four characters of the MAC address as the management name. The processing actually executed at S103 is processing of creating a folder of the same folder name as the MAC address under a predetermined folder created in the HDD and creating a file of the multifunction processing machine management information in the created folder.

Upon completion of generating and storing the multifunction processing machine management information (S103), the scan agent computer 50 returns information indicating that the IP address registration and check request has been normally processed to the apparatus transmitting the IP address registration and check request (digital multifunction processing machine 10, control unit 11) (S106). Then, the scan agent computer 50 completes the IP address registration and check processing.

On the other hand, if the multifunction processing machine management information corresponding to the received IP address registration and check request is stored in the scan agent computer (YES at S101), the scan agent computer 50 determines whether or not the apparatus IP address contained in the multifunction processing machine management information matches the apparatus IP address contained in the received IP address registration and check request (S104). If both the IP addresses match (YES at S104), the scan agent computer 50 executes S106. If the IP addresses do not match (NO at S104), the scan agent computer 50 changes the apparatus IP address in the multifunction processing machine management information with the apparatus IP address not matching that in the received IP address registration and check request although the MAC address matches that in the received IP address registration and check request to the apparatus IP address contained in the IP address registration and check request (S105) and then executes S106.

Referring again to FIG. 5, the description of the information stored in the scan agent computer 50 is continued.

Various pieces of information stored by user in the scan agent computer 50 are information that can be set by accessing the scan agent computer 50 with the Web browser.

Figure 7:
FIG. 7 is a schematic representation of a scan user setting page provided by the scan agent computer.
Figure 8:
FIG. 8 is a schematic representation of an option setting page provided by the scan agent computer.

Specifically, the user management information is information made up of the user name, the mail address, the password, processing completion notification required/not required information, etc., and is also information that can be set using a scan user setting page 60 and an option setting page 65 shown in FIGS. 7 and 8 respectively. The processing completion notification required/not required information is information indicating whether or not transmission of processing completion notification mail (described later in detail) is required (information set by operating a radio button (option button) concerning "processing completion notification mail" on the option setting page 65 shown in FIG. 8). The scan user setting page 60 and the option setting page 65 are Web pages that can be displayed after the user (manager) logs in to the system using the manager name and the password. That is, the user management information is information set by the manager.

Figures 9, 10:
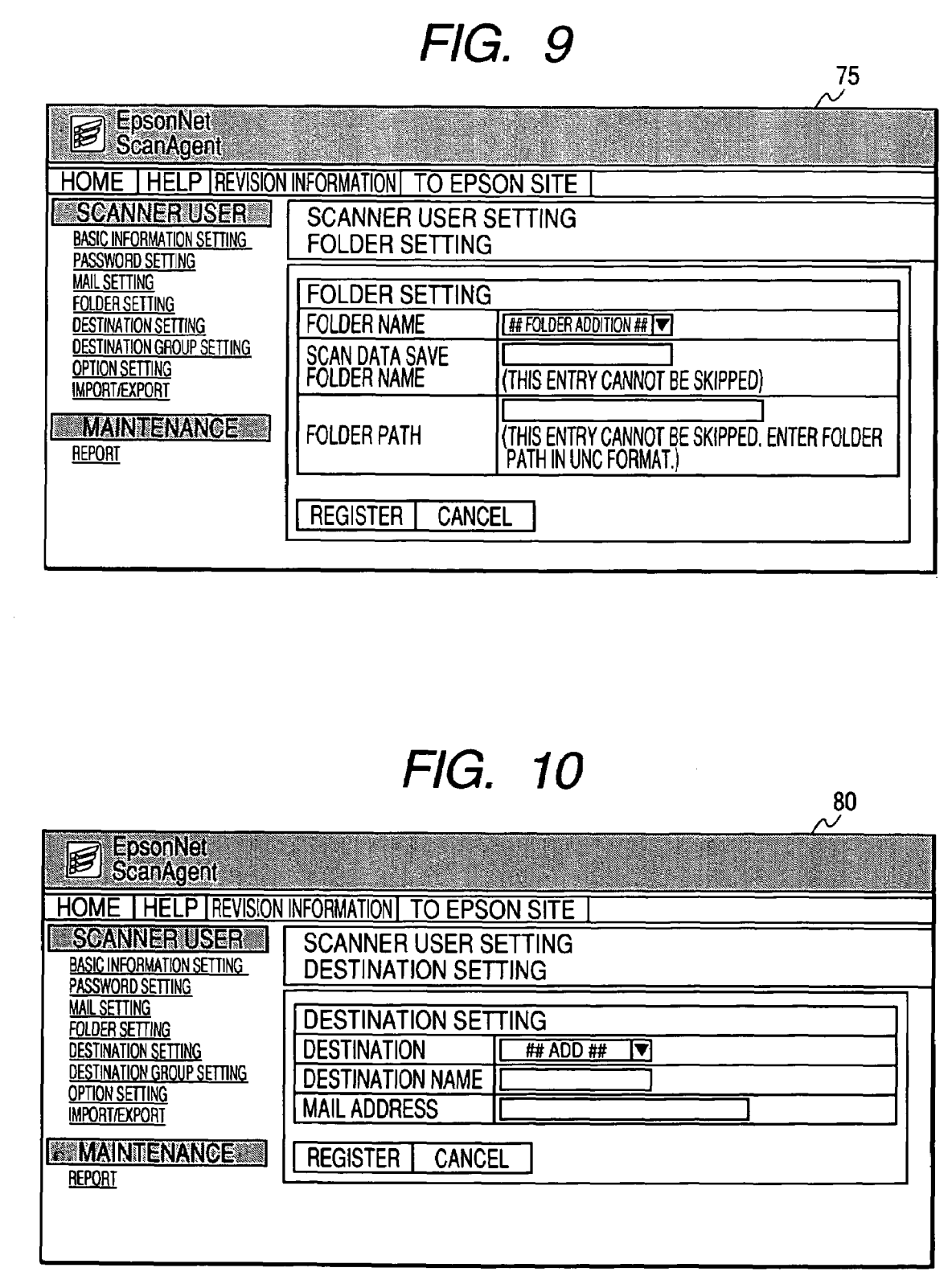
Figure 11:
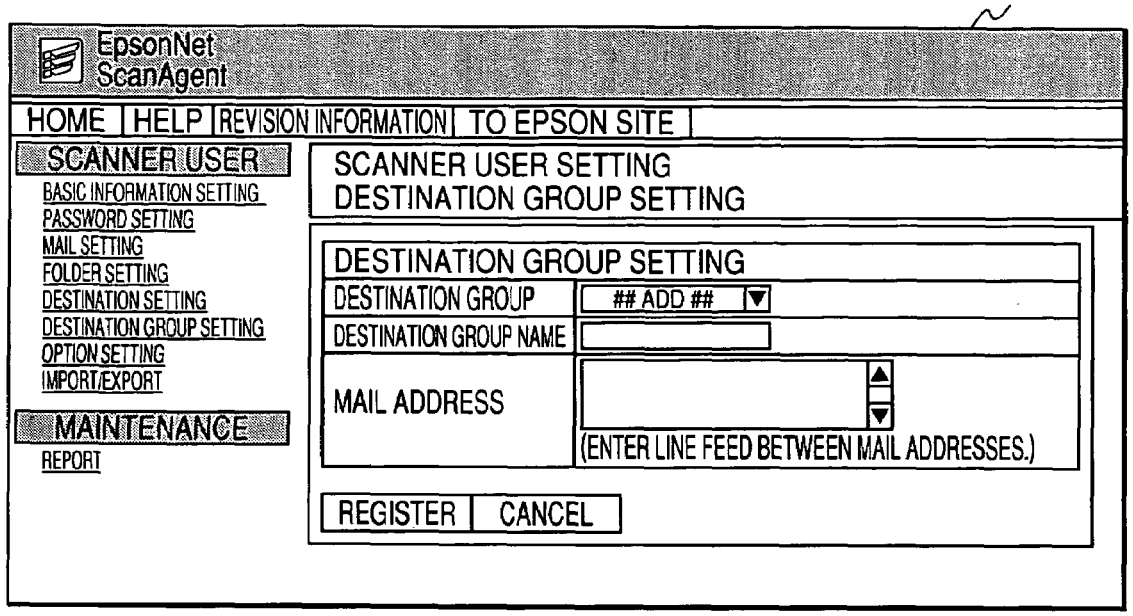
FIG. 11 is a schematic representation of a destination group setting page provided by the scan agent computer.

The destination definition information stored with respect to each user in the scan agent computer 50 is information set by the user whose user management information has been set (whose user registration is complete) using a folder setting page 75, a destination setting page 80, and a destination group setting page 85 shown in FIGS. 9 to 11 respectively. The setting pages are Web pages that can be displayed after login requiring the user name and the password (if no password is set, only the user name) is performed, and the information entered in the setting pages is stored in the HDD of the scan agent computer 50 as the information concerning the user logging in to the system (save, mail, and group destination definition information).

The scan data transmission system is configured as a system in which the information stored in the scan agent computer 50 is used as follows:

The control unit 11 has an operation mode for causing the digital multifunction processing machine 10 to operate as a copier, which will be hereinafter referred to as the copy mode, and an operation mode for causing a system made up of the digital multifunction processing machine 10 and the scan agent computer 50 to operate as a system (scan data transmission system actually functioning) that can execute scan data transmission processing (processing made up of data transmission processing performed by the scan agent computer 50 and processing performed by the digital multifunction processing machine 10; described later in detail), which will be hereinafter referred to as the scan mode.

Figure 12:
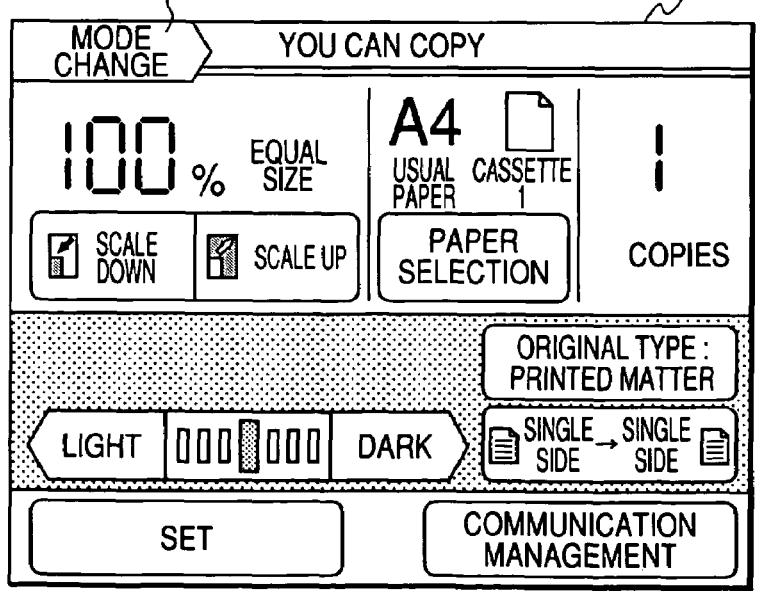
FIG. 12 is a schematic representation of a copy basic screen displayed by the control unit.

When the control unit 11 operates in the copy mode, usually the control unit 11 displays a copy basic screen 100 shown in FIG. 12 on the touch screen 31.

If the user wants to start the scan mode operation of the control unit 11 (if the user wants to cause the scan data transmission system to perform scan data transmission processing), the user presses a mode change button 101 on the copy basic screen 100.

Figure 13:
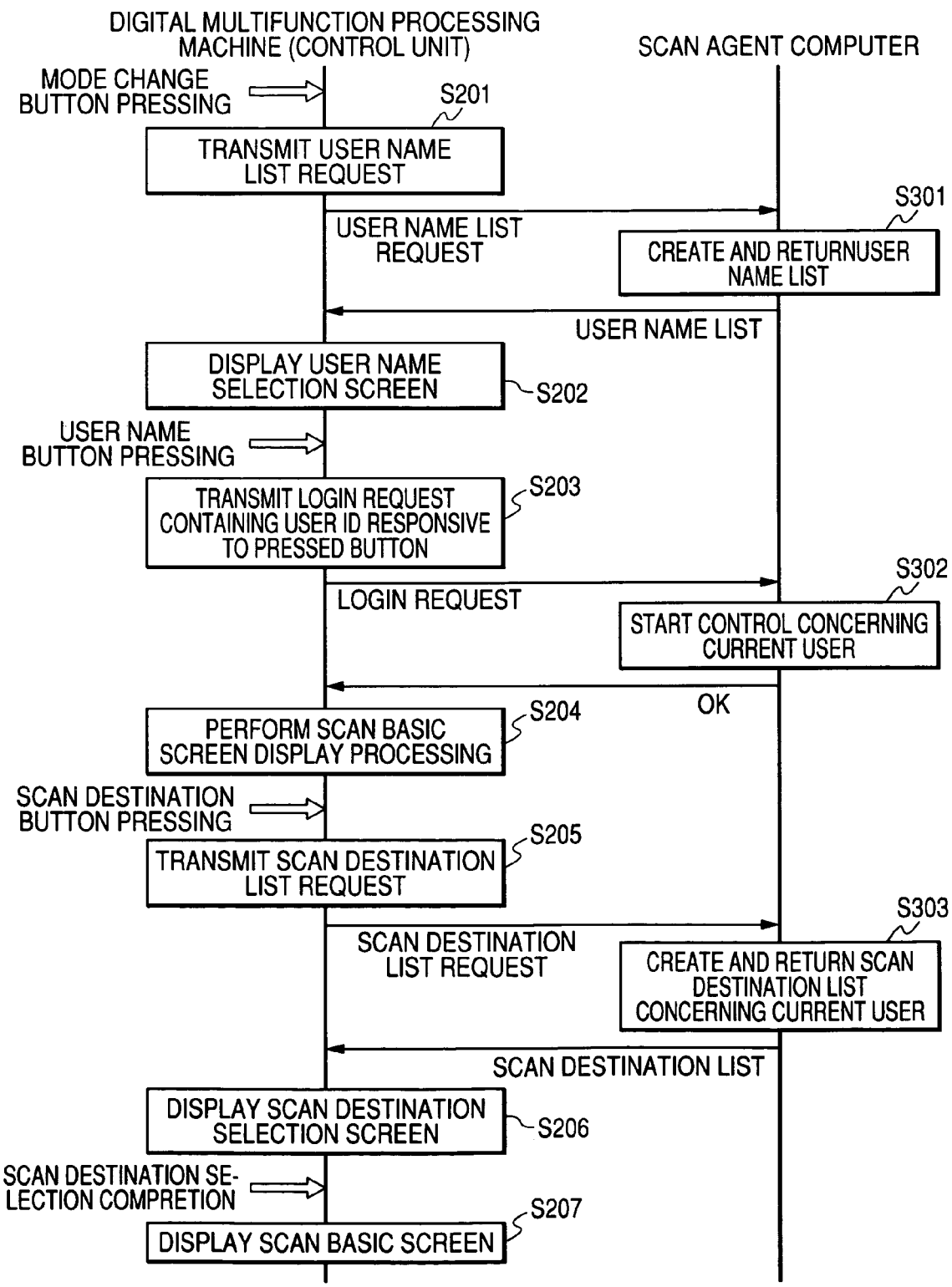
FIG. 13 is a sequence chart to show an operation procedure of the scan data transmission system.

As the user presses the mode change button 101, the control unit 11 starts the scan mode operation. The control unit 11 first transmits a user name list request to the scan agent computer 50 (apparatus having the agent IP address stored in the EEPROM 24) (S201), as shown in FIG. 13. The scan data transmission system is a system in which communications between the control unit 11 and the scan agent computer 50 are conducted according to HTTP (a system in which various pieces of information are transferred between the control unit 11 and the scan agent computer 50 according to request and response bodies of the HTTP).

Upon reception of the user name list request, the scan agent computer 50 creates a user name list from the user management information group stored in the scan agent computer and returns the created user name list to the digital multifunction processing machine 10 (S301). The user name list provides information containing the user names of the users and information indicating whether or not each of the users is a person who sets the password.

Figure 14:
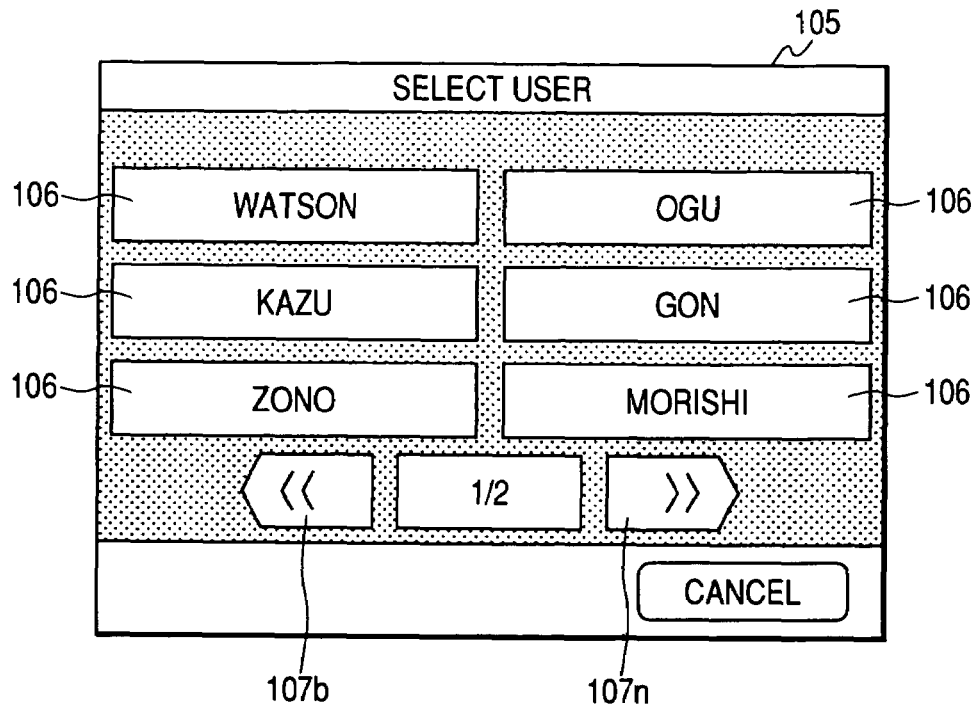
FIG. 14 is a schematic representation of a user name selection screen displayed by the control unit.

Upon reception of the user name list, the control unit 11 displays a user name selection screen 105 as shown in FIG. 14 on the touch screen 31 based on the user name list (S202). That is, the control unit 11 displays the user name selection screen 105 including user name buttons 106 indicting the user names contained in the received user name list on the touch screen 31.

If the user presses one user name button 106 on the user name selection screen 105, the control unit 11 transmits a login request containing the user name corresponding to the pressed user name button 106 to the scan agent computer 50 (S203). If the pressed user name button 106 corresponds to the user setting the password (see FIGS. 5 and 7), the control unit 11 displays a password entry screen on the touch screen 31, thereby requesting the user to enter the password. The control unit 11 transmits a login request containing the password entered by the user and the user name to the scan agent computer 50.

Upon reception of the login request, the scan agent computer 50 checks that user management information containing the same information as the information contained in the login request (user name or user name and password) exists, and then starts processing of handling the request from the control unit 11 transmitting the login request as the request from the user identified by the user name contained in the login request, which will be hereinafter referred to as the current user, (session management in the figure) (S302). The scan agent computer 50 returns information indicating acceptance of the login request (OK in the figure) to the digital multifunction processing machine 10.

Figure 15:
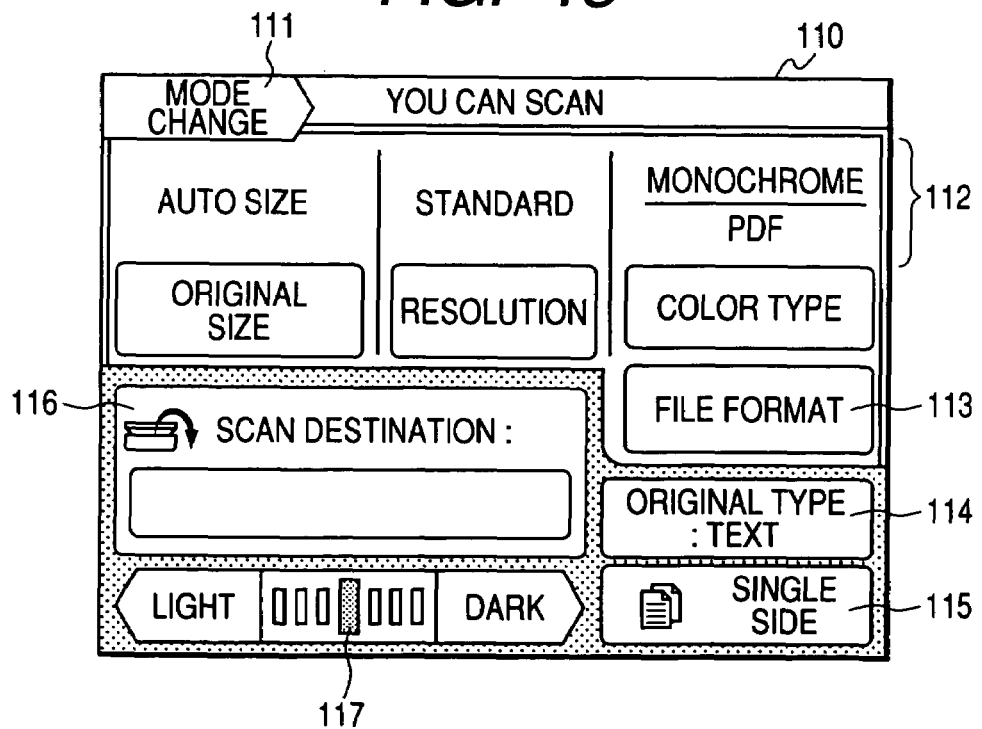
FIG. 15 is a schematic representation of a scan basic screen displayed by the control unit.

Upon reception of the information, the control unit 11 displays a scan basic screen 110 in the format shown in FIG. 15 on the touch screen 31 (S204).

A mode change button 111 on the scan basic screen 110 is a button for causing the control unit 11 to start the copy mode operation as the user presses the button.

A setup value area 112 on the scan basic screen 110 is an area indicating the setup values concerning the original size, the resolution, the color type, and the file format at the current point in time. ORIGINAL SIZE button, RESOLUTION button, COLOR TYPE button, and FILE FORMAT button 113 are buttons for changing the setup values concerning the original size, the resolution, the color type, and the file format respectively.

An ORIGINAL TYPE button 114 is a button for specifying the type of original (which of printed matter, photo, and almost all text the original is). The ORIGINAL TYPE button 114 is a button for indicating the setup value at the point in time (in the figure, text) inside the button. A single side/double side change button 115 is a button for specifying which of double sides and single side of the original to read. The single side/double side change button 115 is also a button for indicating the setup value at the point in time (in the figure, single side) inside the button.

Figure 16:
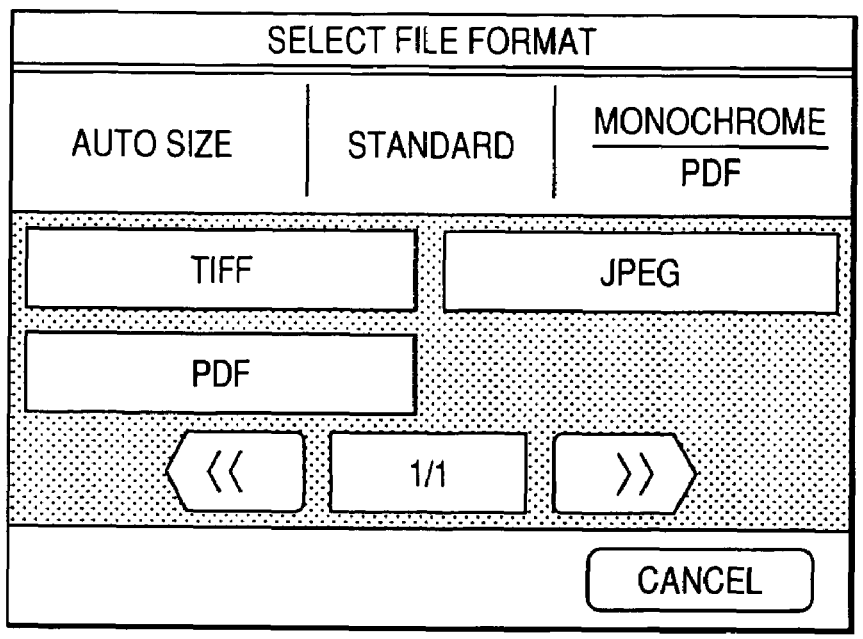
FIG. 16 is a schematic representation of a file format selection screen displayed by the control unit.
Figure 17:
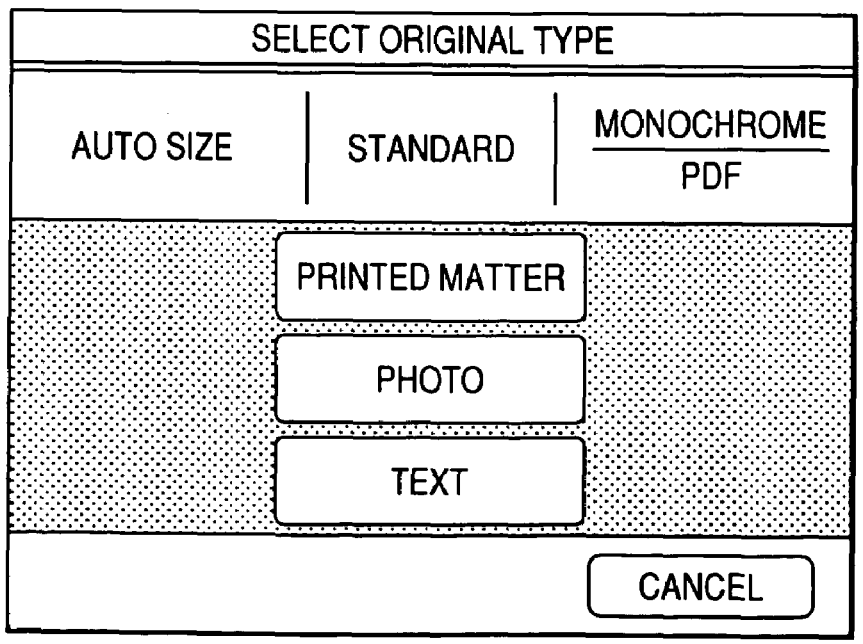
FIG. 17 is a schematic representation of an original type selection screen displayed by the control unit.

Each of these buttons is a button for displaying another screen on the touch screen 31 as the user presses the button. For example, the FILE FORMAT button 113 is a button for displaying a file format selection screen as shown in FIG. 16 on the touch screen 31 as the user presses the button, and the ORIGINAL TYPE button 114 is a button for displaying an original type selection screen shown in FIG. 17 on the touch screen 31 as the user presses the button.

On the other hand, a LIGHT button and a DARK button provided on the scan basic screen 110 (buttons for adjusting the scan density) are buttons not displaying another screen as the user presses the button (if the user presses either button, the display position of a density cursor 117 moves).

A scan destination button 116 is a button for specifying the destination (final destination) of scan data (image data generated by the scanner 12).

If the user presses the scan destination button 116, the control unit 11 transmits a scan destination list request to the scan agent computer 50 (S205 in FIG. 13).

Upon reception of the scan destination list request, the scan agent computer 50 creates a scan destination list containing the name of the destination definition information and information indicating which of save destination definition information, mail destination definition information, and group destination definition information the destination definition information is for each destination definition information stored in the scan agent computer in association with the current user, and returns the created scan destination list to the control unit 11 (S303).

Figure 18:
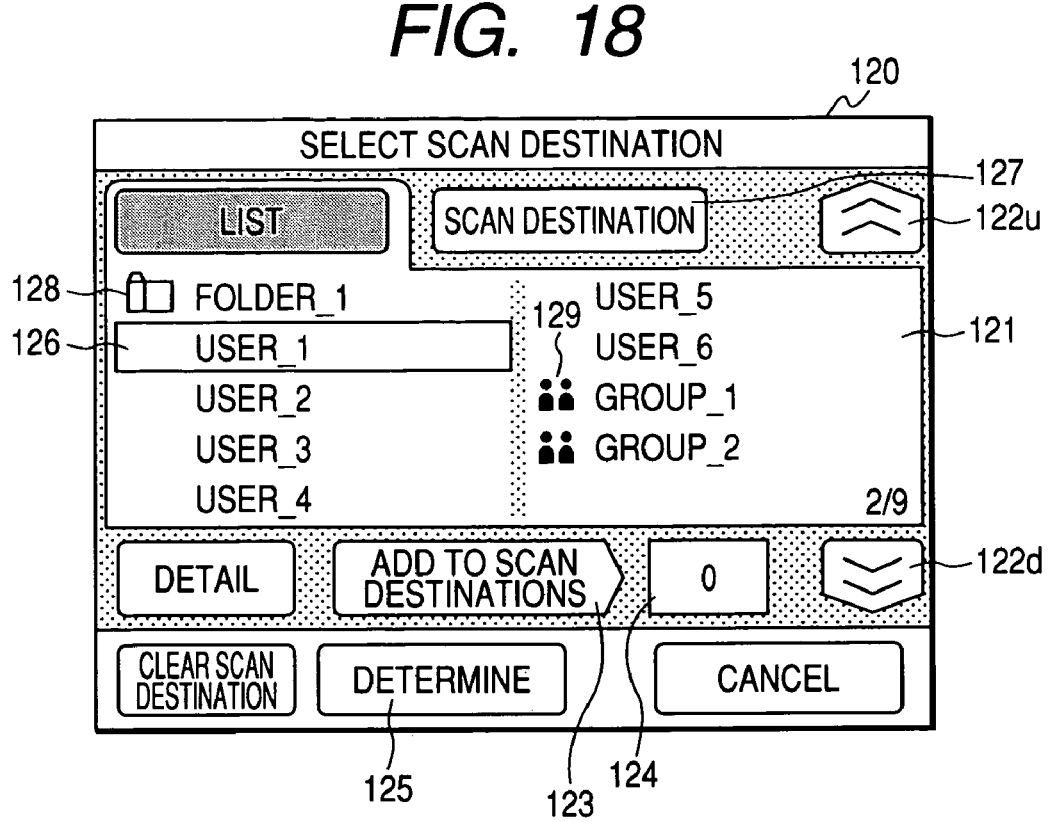
FIG. 18 is a schematic representation of a scan destination selection screen displayed by the control unit.

Upon reception of the scan destination list, the control unit 11 displays a scan destination selection screen 120 in the format shown in FIG. 18 on the touch screen 31 based on the scan destination list (S206).

A list area 121 included in the scan destination selection screen 120 is an area indicating the names of destination definition information previously registered by the user (FOLDER_1, USER_1, etc., hereinafter also referred to as the destination definition information names). As seen in FIG. 18, the list area 121 is an area indicating a pattern 128 and the name (FOLDER_1) for each save destination definition information, only the name (USER_1, etc.,) for each mail destination definition information, and a pattern 129 and the name (GROUP_1, etc.,) for each group destination definition information.

The scan destination selection screen 120 is a screen for enabling the user to select any number of pieces of destination definition information as the user operates the screen as follows:

If the user wants to select one destination definition information (save destination definition information, mail destination definition information, or group destination definition information), the user forms a state in which a selection frame 126 is displayed in the portion in which the destination definition information name to be selected is displayed by operating a button 122*u* and a button 122*d*. Then, the user presses an ADD TO SCAN DESTINATIONS button 123.

When the user presses the ADD TO SCAN DESTINATIONS button 123, the control unit 11 stores selection of the destination definition information identified by the destination definition information name enclosed in the selection frame 126. The control unit 11 increments the numeric value in a number-of-selections display field 124 by one and erases the destination definition information name enclosed in the selection frame 126 from the list area 121.

Figure 19:
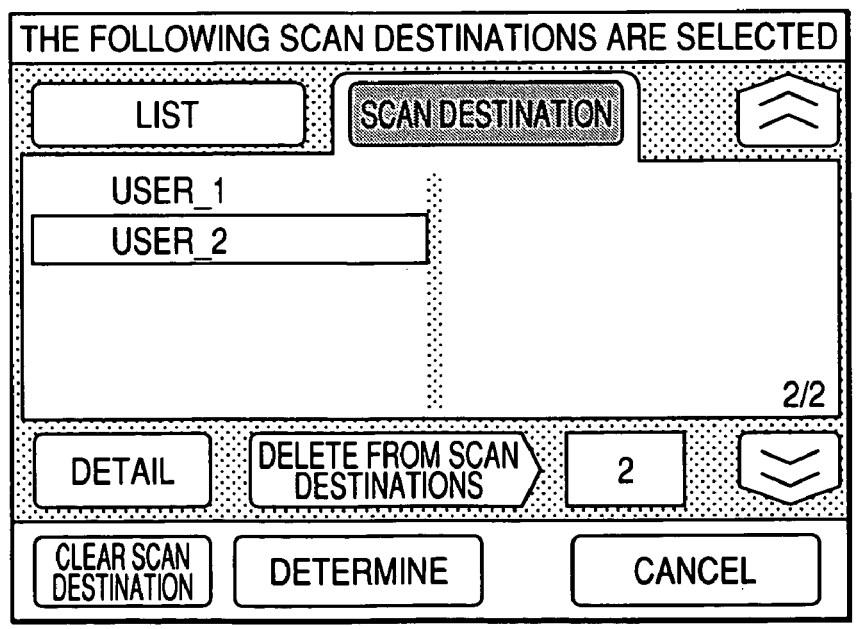
FIG. 19 is a schematic representation of a scan destination check/deletion screen displayed by the control unit.

To select two or more pieces of destination definition information (to specify two or more destinations of scan data), the user performs operation as described above for each destination definition information and then presses a DETERMINE button 125. A scan destination button 127 on the scan destination selection screen 120 is a button for displaying a scan destination check/deletion screen shown in FIG. 19 on the touch screen 31 as the user presses the button. To check the selected destination definition information, etc., the user displays the scan destination check/deletion screen and then presses a DETERMINE button on the scan destination check/deletion screen (or the DETERMINE button 125 on the scan destination selection screen 120).

When the user presses the DETERMINE button 125 (or the DETERMINE button on the scan destination check/deletion screen), a scan basic screen 110 indicating information concerning the destination definition information selected by the user (a list of the destination definition information names) in the scan destination button 116 is displayed on the touch screen 31.

Figure 20:
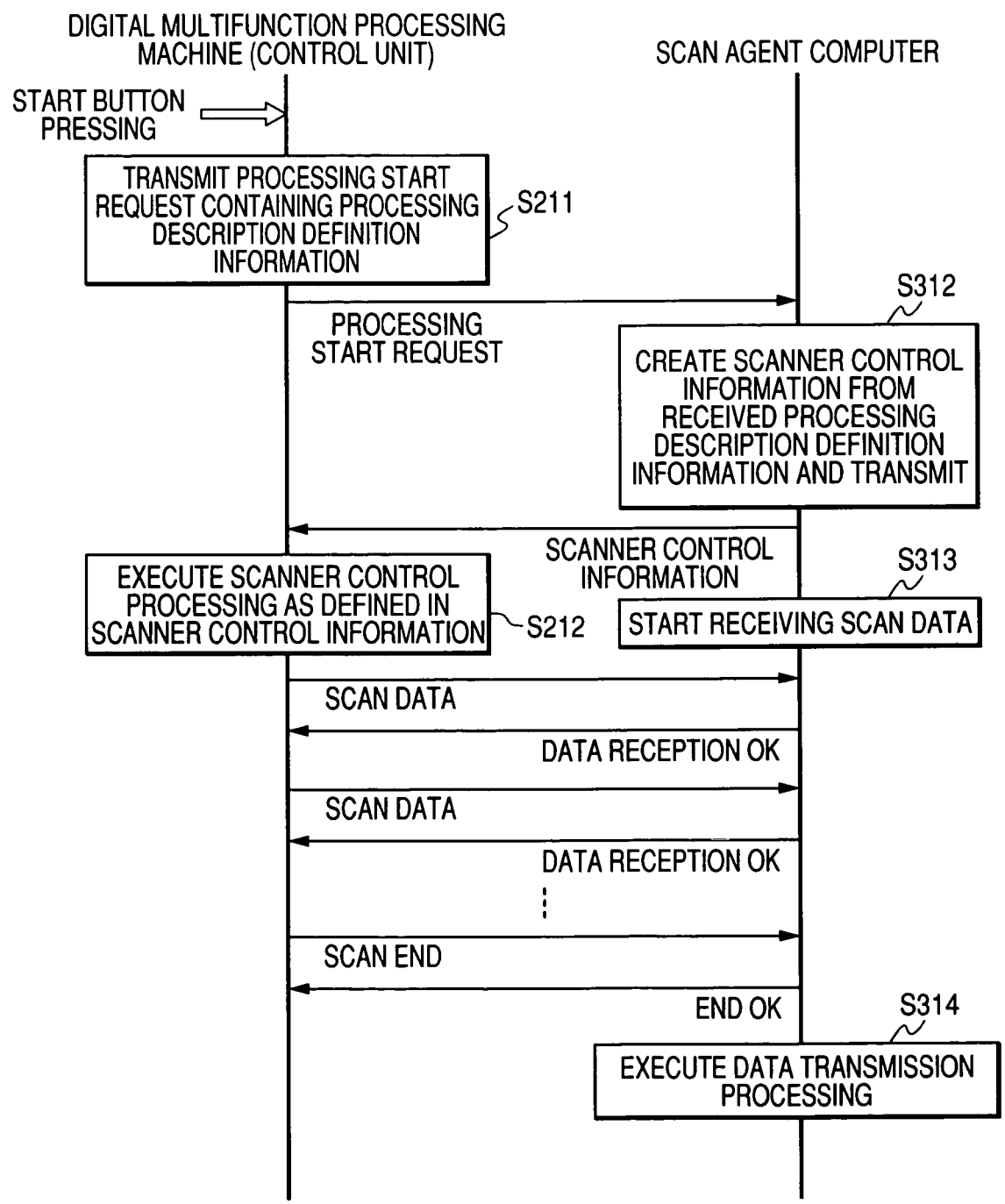
FIG. 20 is a sequence chart to show an operation procedure of the scan data transmission system.

If the start button 32*s* is pressed in a state in which the scan destination is set, the control unit 11 transmits a processing start request containing the processing description definition information at the point in time (a set of the setup values of the items displayed on the scan basic screen 110) to the scan agent computer 50 (S211) as shown in FIG. 20.

Upon reception of the processing start request, the scan agent computer 50 creates scanner control information based on the processing description definition information contained in the processing start request and returns the created scanner control information to the control unit 11 (S312). The scanner control information is information provided by converting the items in the processing description definition information (only the information involved in control of the scanner 12) into information to control the scanner 12 (commands).

Upon reception of the scanner control information, the control unit 11 performs control processing as defined in the scanner control information for the scanner 12 (S212). In short, the control unit 11 causes the scanner 12 to start the operation.

The control unit 11 enters a mode of transferring the scan data transmitted by the scanner 12 to the scan agent computer 50.

On the other hand, the scan agent computer 50 returning the scanner control information to the control unit 11 starts processing of receiving the scan data transmitted from the control unit 11 and storing the scan data in the HDD (S313) When information indicating completion of transmission of all scan data (in the figure, scan completion) is transmitted from the control unit 11, the scan agent computer 50 performs data transmission processing (S314).

At the data transmission processing time, the scan agent computer 50 first determines whether or not it is necessary to execute file save processing (processing of saving the file of the received scan data in a shared folder) (S401) as shown in FIG. 21. That is, the scan agent computer 50 determines whether or not the processing description definition information already received from the digital multifunction processing machine 10, which will be hereinafter referred to as the current processing description definition information, contains any save destination definition information name.

If it is necessary to execute file save processing (YES at S401), the scan agent computer 50 creates a file in the file format specified in the current processing description definition information from the already received scan data (S402). Next, the scan agent computer 50 performs processing of saving the created file in each folder specified in the current processing description definition information (S403) by referencing the destination definition information concerning the current user in the HDD.

At S402, if the specified file format and color type are TIFF and MONOCHROME respectively, a TIFF file compressed in MMR (G4) is created; if the specified file format and color type are TIFF and COLOR or GRAY SCALE respectively, a TIFF file not compressed is created. At S403 (and S402), a file having the name generated from the current date and time is saved (created).

The scan agent computer 50 completing S403 or recognizing that it is not necessary to execute file save processing (NO at S401) determines whether or not it is necessary to execute mail transmission processing (processing of transmitting e-mail to which the file of the received scan data is attached) (S404). That is, the scan agent computer 50 determines whether or not the current processing description definition information contains any mail destination definition information name or group destination definition information name.

If it is necessary to execute mail transmission processing (YES at S404), the scan agent computer 50 determines whether or not a scan data file is already created (S405). If a scan data file is not yet created (NO at S405), the scan agent computer 50 creates a file in the file format specified in the current processing description definition information from the already received scan data (S406). At S406, if the specified file format and color type are TIFF and MONOCHROME respectively, a TIFF file compressed in MMR (G4) is created; if the specified file format and color type are TIFF and COLOR or GRAY SCALE respectively, a TIFF file compressed in JPEG is created.

The scan agent computer 50 performs processing of transmitting e-mail to which the created file is attached to each destination specified in the current processing description definition information (S409) by referencing the destination definition information concerning the current user in the HDD.

On the other hand, if a scan data file is already created (YES at S405), the scan agent computer 50 determines whether or not the condition that the specified file format and color type are TIFF and COLOR or GRAY SCALE respectively is satisfied (S407).

If the condition is not satisfied (NO at S407), the scan agent computer 50 performs processing of transmitting e-mail to which the created file is attached to each destination specified in the current processing description definition information (S409).

On the other hand, if the condition is satisfied (YES at S407), the scan agent computer 50 creates a TIFF file compressed in JPEG from the already created file (in this case, TIFF file not compressed) (S408) and then performs processing of transmitting e-mail to which the created file is attached to each destination specified in the current processing description definition information (S409).

The scan agent computer 50 completing S409 or recognizing that it is not necessary to execute mail transmission processing (NO at S404) determines whether or not the current user is a person to whom processing completion notification mail needs to be transmitted (S410). That is, the scan agent computer 50 determines whether or not the processing completion notification required/not required information concerning the current user (see FIGS. 5 and 8) is information indicating that transmission of processing completion notification mail is required.

If the current user is a person to whom processing completion notification mail needs to be transmitted (YES at S410), the scan agent computer 50 creates and transmits processing completion notification mail setting information representing the description and the result of the executed processing in the subject and the main body with the mail address of the current user as the destination mail address (see FIGS. 5 and 7) (S411).

More specifically, at S411, the scan agent computer 50 transmits processing completion notification mail containing a character string made up of the destination definition information name for each destination ("folderA," "UserA") and information indicating the type of processing performed for each destination ("ScanImage," "SendData") as the subject and text indicating the description and the result of each executed processing by destination as the main body, as shown in FIGS. 22A to 22C. The scan agent computer 50 (the scan agent program 40) is an apparatus (program) that can respond to a download request of a file saved in the shared folder set in the apparatus and is also an apparatus (program) for containing the URL of the file in the processing completion notification mail for each file saved in the shared folder set in the apparatus.

The scan agent computer 50 completing S411 completes the data transmission processing. If the current user is not a person to whom processing completion notification mail needs to be transmitted (NO at S410), the scan agent computer 50 completes the data transmission processing without transmitting processing completion notification mail.

If a state in which information is not transmitted from the control unit 11 continues for a previously specified time or more or if information indicating occurrence of an error is transmitted from the control unit 11, the scan agent computer 50 executes the data transmission processing by skipping S404 to S404. That is, the scan agent computer 50 performs processing of saving a file of the scan data received at the point in time (a part of the image data of the original) in the specified folder and processing of transmitting processing completion notification mail.

As described above in detail, if one user enters a processing start command, the scan data transmission system according to the embodiment transmits processing completion notification mail to the user upon completion of the processing. Therefore, the user of the scan data transmission system can easily keep track of the termination of the processing started by the user.

Figure 23A:
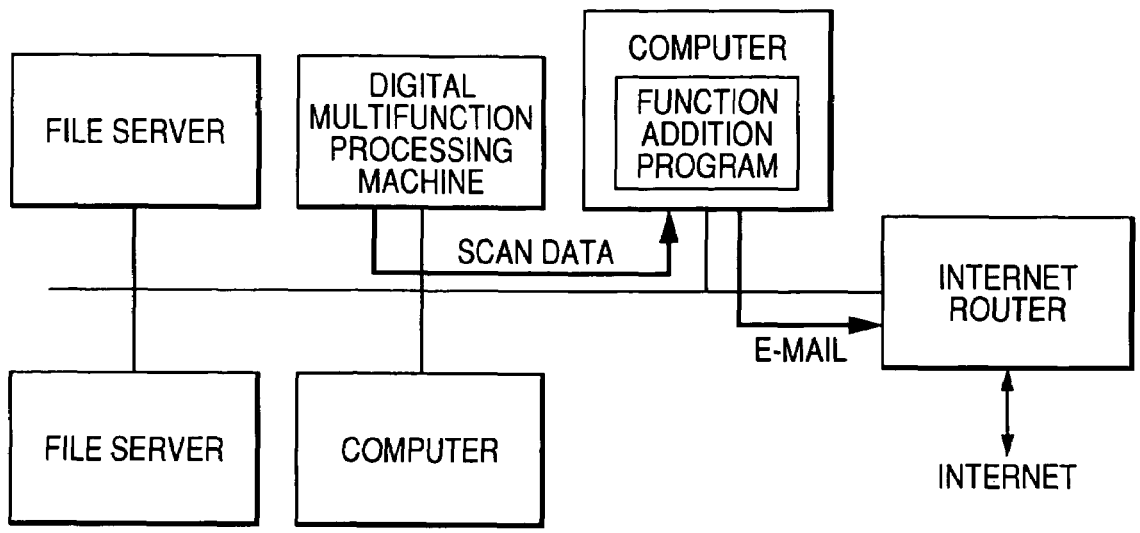
FIGS. 23A and 23B are schematic representation of scan to mail processing and scan to file processing performed by a system in a related art.
Figure 23B:
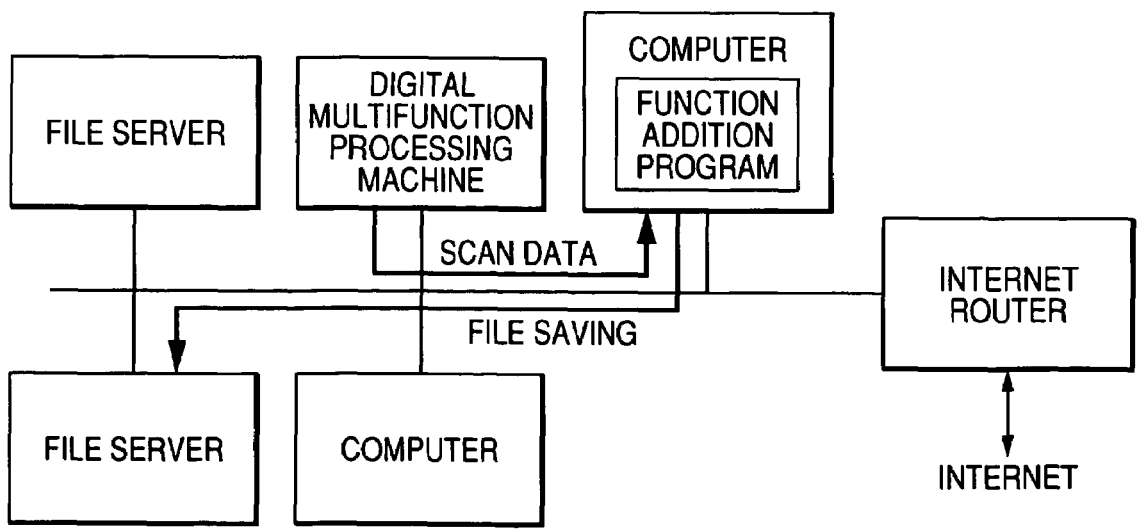

The processing completion notification mail transmitted by the scan data transmission system is mail in which a character string indicating the description of the destination specified by the user (see FIGS. 23A to 23C) is set in the subject. Thus, the scan data transmission system is also a system wherein the user can keep track of the description (summary) of the processing performed in the past simply by causing the mailer to display a received mail list.

<Modifications>

Various modifications of the scan data transmission system according to the embodiment can be made. For example, the scan data transmission system is a system made up of one or more digital multifunction processing machines 10 and the scan agent computer 50, but may be implemented as one apparatus having the same function as the scan data transmission system based on the technology used with the scan data transmission system.

The digital multifunction processing machine 10 is an apparatus for requesting the user to select the user name on the user name selection screen 105 provided with a plurality of user name buttons 106 (FIG. 14), but may be an apparatus for displaying a screen for enabling the user to enter the user name rather than the user name selection screen 105. The specific format of any other screen displayed by the digital multifunction processing machine 10 may be made different from that described above or the digital multifunction processing machine 10 may be implemented as a single dedicated apparatus (rather than an apparatus using a plurality of units in combination).

What is claimed is:

1. A scan data transmission apparatus being connected to a network for use, said scan data transmission apparatus comprising:

an image data generator that generates from a set original, image data representing an image on the original;

an information storage that stores a plurality of user names and a plurality of e-mail addresses in such a manner that correspondence between the user names and the e-mail addresses can be understood;

a user interface unit that allows a user to specify a file path of a folder in which a file of the image data generated by the image data generator is to be saved after the user specifies one user name from among the user names stored in the information storage;

an image data transmitter that executes, when a processing start command is entered, processing of causing the image data generator to generate the image data and saving a file concerning the image data in the folder identified by the folder path specified by the user for the user interface unit; and a processing completion notification mail transmitter that transmits, when the processing of the image data transmitter terminates, transmits processing completion notification mail of e-mail to the e-mail address which is stored in the information storage and related to the user name specified by the user, wherein the processing completion notification includes a main body that indicates, whether or not the processing of the image data transmitter has normally completed, wherein the processing completion notification mail transmitter transmits processing completion notification mail in which the file path specified by the user for the user interface unit is set in the main body as the processing completion notification mail.

2. The scan data transmission apparatus according to claim 1, wherein the user interface unit allows the user to specify any number of file paths of folders in which a file of the image data generated by the image data generator is to be saved and any number of destination mail addresses of e-mail to which a file of the image data generated by the image data generator is attached, when the processing start command is entered, if the user does not specify any destination mail address for the user interface unit, the image data transmitter performs processing of causing the image data generator to generate image data and saving a file concerning the image data in each folder identified by each folder path specified by the user; if the user does not set any file path for the user interface unit, the image data transmitter performs processing of causing the image data generator to generate image data and creating and transmitting e-mail to which a file concerning the image data is attached with each destination mail address specified by the user as the destination mail address; and if the user specifies one or more file paths and one or more mail addresses for the user interface unit, the image data transmitter performs processing of causing the image data generator to generate image data and saving a file concerning the image data in each folder identified by each folder path specified by the user and processing of creating and transmitting e-mail to which, a file concerning the image data is attached with each destination mail address set by the user as the destination mail address, and the processing completion notification mail transmitter transmits the processing completion notification mail the main body of which indicates whether or not the processing of the image data transmitter has normally completed by file destination.

3. The scan data transmission apparatus according to claim 2, wherein the processing completion notification mail transmitter transmits processing completion notification mail in which each file path and each mail address specified by the user for the user interface unit are set in the main body together with information indicating the type of processing performed by the image data transmitter.

4. The scan data transmission apparatus according to claim 1, wherein the processing completion notification mail transmitter transmits the processing completion notification mail a subject of which indicates a description of the destination specified by the user.

5. A scan data transmission system comprising an information processing apparatus and an auxiliary information processing apparatus connected to a network, wherein
the auxiliary information processing apparatus comprises:
a first processing execution unit that performs processing of saving a file concerning image data transmitted from the information processing apparatus in a folder identified by a folder path transmitted from the information processing apparatus;
a second processing execution unit that performs processing of transmitting e-mail to which the file concerning image data transmitted from the information processing apparatus is attached with a destination mail address transmitted from the information processing apparatus as a destination mail address; and
a third processing execution unit that performs processing of saving a file concerning image data transmitted from the information processing apparatus in a folder identified by a folder path transmitted from the information processing apparatus and processing of transmitting e-mail to which the file concerning image data is attached with a destination mail address transmitted from the information processing apparatus as a destination mail address, and
the information processing apparatus comprises:
an image data generator that generates from a set original, image data representing an image on the original;
a user interface unit that requests a user to specify the descriptions of processing to be executed and allows the user to specify both or either of a file path of a folder in which a file of the image data generated by the image data generator is to be saved and a destination mail address of e-mail to which a file of the image data generated by the image data generator is attached; and
a controller,
wherein when a processing start command is entered, if the user specifies only the file path for the user interface unit, the controller causes the image data generator to generate image data and transmits the image data and the file path specified by the user to the auxiliary information processing apparatus, to cause the first processing execution unit to function,
wherein if the user specifies only the mall address for the user interface unit, the controller causes the image data generator to generate image data and transmits the image data and the mail address specified by the user to said auxiliary information processing apparatus, to cause the second processing execution unit to function, and
wherein if the user specifies the file path and the mail address for the user interface unit, the controller causes the image data generator to generate image data and transmits the image data and the file path and the mail address specified by the user to the auxiliary information processing apparatus, to cause the third processing execution unit to function.

* * * * *